United States Patent
Alavi et al.

(10) Patent No.: US 6,691,100 B1
(45) Date of Patent: Feb. 10, 2004

(54) HTML/DHTML WEB INTERFACE SYSTEM AND METHOD

(75) Inventors: Ali Alavi, Arlington, VA (US); Gunther L. Brenes, Oakland, CA (US); Luis A. Dector, Fairfax, VA (US); Douglas L. Everhart, Arlington, VA (US); Arturo Oliver, Reston, VA (US); Ramkumar Ramachandran, Reston, VA (US)

(73) Assignee: MicroStrategy, Incorporated, McLean, VA (US)

( * ) Notice: Subject to any disclaimer, the term of this patent is extended or adjusted under 35 U.S.C. 154(b) by 429 days.

(21) Appl. No.: 09/884,445

(22) Filed: Jun. 20, 2001

(51) Int. Cl.⁷ ............................................. G06F 17/30

(52) U.S. Cl. .............................................. 707/2; 707/1

(58) Field of Search ............................... 707/1, 2, 3, 4, 707/5, 6, 7, 8, 9, 10, 101, 102, 103 R; 717/511

(56) References Cited

U.S. PATENT DOCUMENTS

| | | | |
|---|---|---|---|
| 4,688,195 A | 8/1987 | Thompson | 706/11 |
| 4,829,423 A | 5/1989 | Tennant | 704/8 |
| 5,197,005 A | 3/1993 | Shwartz | 707/2 |
| 5,276,870 A | 1/1994 | Shan | 707/2 |
| 5,418,943 A | 5/1995 | Borgida | 707/4 |
| 5,421,008 A | 5/1995 | Banning | 707/4 |
| 5,555,403 A | 9/1996 | Cambot | 707/4 |
| 5,584,024 A | 12/1996 | Shwartz | 707/4 |
| 5,664,182 A | 9/1997 | Nirenberg | 707/102 |
| 5,692,181 A | 11/1997 | Anand | 707/102 |
| 5,737,592 A | 4/1998 | Nguyen | 707/4 |
| 5,864,856 A | 1/1999 | Young | 707/100 |
| 5,914,878 A | 6/1999 | Yamamoto | 700/106 |
| 6,154,766 A | 11/2000 | Yost | 709/201 |
| 6,247,008 B1 | 6/2001 | Cambot | 707/3 |
| 6,279,033 B1 | 8/2001 | Selvarajan | 709/217 |
| 6,408,292 B1 * | 6/2002 | Bakalash et al. | 707/2 |
| 6,424,979 B1 * | 7/2002 | Livingston et al. | 715/511 |

OTHER PUBLICATIONS

J. Emigh, Information Builders, Inc. Launches WebFocus Suite, pp. 1–3.

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp 151–158.

(List continued on next page.)

Primary Examiner—Diane D. Mizrahi
Assistant Examiner—Yicun Wu
(74) Attorney, Agent, or Firm—Hunton & Williams LLP

(57) ABSTRACT

A web interface system and a method for use with a business information system are provided. The web interface system provides an interface to a user and comprises a first set of HTML interface tools located on a business intelligence server, the first set of HTML interface tools including spreadsheet tools, graphing tools, auto-prompt tools, and report generation and management tools. The web interface system additionally includes a second set of HTML interface tools located on a web server, the second set of HTML interface tools including navigation tools and internationalization tools. The web interface system also includes a communication link between the business intelligence server, the web server, and the user, such that the user is able to utilize the first set of HTML interface tools and the second set of HTML interface tools.

26 Claims, 4 Drawing Sheets

OTHER PUBLICATIONS

Harry R. Tennant, Member, IEEE, Rober R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu–Based Natural Interfaces To Databases, Proceedings on the Ninth International Conference on Very Large Data Bases, Florence, Italy, Oct. 31–Nov. 2, 1983, pp 43–55.

Craig W. Thompson, John Kolts, and Kenneth W. Ross, A Toolkit for Building "Menu–Based Natural Language" Interfaces, Texas Insruments Incorporated, P. O. Box 226015, MS 238, Dallas, Texas 75265, 1985.

Craig Warren Thompson, M.A., B.A., Using Menu–Based Natural Language Understanding to Avoid Problems Associated with Tranditional Natural Language Interfaces to Databases, Dissertation Presented to the Faculty of the Graduate School of The University of Texas at Austin, May 1984.

Microstrategy Announces DSS Web, First Relational OLAP Interface for Accessing Data Warehouses Via the World Wide Web.

Microstrategy Announces DSS Web 4.1, Latest Version Provides Web–Based Warehouse Users With More Complex Ad Hoc Analysis Capabilities Than Any Product Available.

Microstrategy Announces DSS Web 5.0, DSS Web Introduces the Web–Cast of Decision Support.

Microstrategy Addresses Customer Needs With DSS Web 5.1, New Version Provides a Bridge Between Active and Passive Decision Support Environments and Eases the Global Implementation and Deployment Process.

Microstrategy Introduces DSS Web Standard Edition, Web Interface Provides Powerful, Easy–to–Use DSS Tool For Mainstream End–User Market.

Microstrategy Announces Enhanced Versions of DSS Web and DSS Server, New 5.5 Versions offer Advanced Reporting Functionality on Top of the Industry's Most Powerful Analytical Engine for Enterprise–Wide DSS Solutions.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excell Add–In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

Web Intelligence Key Sales Messages (electronic copy on enclosed CD).

Web Intelligence Sizing and Capacity Planning Questions and Answers (electronic copy on enclosed CD).

MicroStrategy Web Version 6.0 System Guide (electronic copy on enclosed CD).

Developer Guide MicroStrategy Web Version 6.0 (electronic copy on enclosed CD).

System Guide Microstratety Web Version 6.5 (electronic copy on enclosed CD).

Developer Guide MicroStrategy Web Version 6.5 (electronic copy on enclosed CD).

* cited by examiner

HTML/DHTML WEB INTERFACE SYSTEM AND METHOD

FIELD OF THE INVENTION

The invention is related to the field of web user interfaces that enable a user to exchange information over a network and more particularly to a system and method for providing an all Hypertext Markup Language/Dynamic Hypertext Markup Language (HTML/DHTML) web user interface for performing queries and other related tasks.

BACKGROUND OF THE INVENTION

In order for users to perform standard tasks such as queries and report navigation, the users are provided with an interface that includes selectable options. The various goals of interface design are enumerated below.

A first goal of interface design is to create an interface that is easy to use. Interfaces should not require the users to have any specific knowledge such as knowledge of SQL and the users should be insulated from relational database concepts.

Another goal of interface design is integration. All interfaces should access the same central repository and be able to create new reports, available to all users with access, regardless of the user's particular interface. A further goal of interface design is scalability. Any client/server interface should be able to work well across all commonly used desktop operating systems.

Yet another goal of interface design is the provision of maximum power and functionality. With regard to the goal of maximizing power and functionality, interface designers aim to provide features that enable users to specify filtering criteria and features that increase ease of navigation. Designers also aim to provide users with selectable views of data within a report. It is also desirable to provide a user with a mechanism for interacting with result sets. Another desired feature enables a user to change the appearance of graphs. A further desired feature is the ability to view information such as toolbar/menus, the grid, and the navigation through the reports simultaneously on a user screen.

Existing interfaces have generally been regulated by ActiveX and JAVA controls because of the high level of functionality provided in these contexts. Despite the functionality provided by the ActiveX and JAVA interfaces, many difficulties have been encountered while operating with these interfaces.

The applications are downloaded onto the client device and run within the browser. The client device would then make http calls back to the web server to get additional information. Installation on client machines often proves to be difficult and is often impeded by security at the client device. Furthermore, the functionality typically consumes a large quantity of memory on the client device. Finally, transmission of a large data set at the client device often consumes excessive bandwidth. Furthermore, the extensive use of java script functions to handle functionality can be cumbersome and subjects the system to java script bugs when dealing with non-standard characters.

Thus, even though these interfaces may have provided sufficient functionality, they have not consistently fulfilled all of the goals of interface design. Accordingly, an interface having all of the desired functionality, but eliminating the aforementioned problems is needed in the art.

SUMMARY OF THE INVENTION

In accordance with the purposes of the invention as embodied and broadly described herein, there is provided a web interface system for use with a business information system, the web interface system providing an interface to a user. The web interface system comprises a first set of HTML interface tools located on a business intelligence server, the first set of HTML interface tools including at least one of spreadsheet tools, graphing tools, auto-prompt tools, and report generation and management tools. The web interface system additionally comprises a second set of HTML interface tools located on a web server, the second set of HTML interface tools including at least one of navigation tools and internationalization tools. The web interface system operates through providing communication between the business intelligence server, the web server, and the user, such that the user is able to utilize the first set of HTML interface tools and the second set of HTML interface tools.

In another aspect of the invention, a method for providing a web interface for a user through the use of a web server and a business intelligence server is disclosed. The method comprises the steps of loading a first set of HTML interface tools on the business intelligence server, the first set of HTML interface tools including at least one of spreadsheet tools, graphing tools, auto-prompt tools, and report generation and management tools. A second step includes loading a second set of HTML interface tools located on the web server, the second set of HTML interface tools including at least one of navigation tools and internationalization tools. An additional step includes providing communication between the business intelligence server, the web server, and the user, such that the user is able to utilize the first set of HTML interface tools and the second set of HTML interface tools.

These and other features, objects, and advantages of the preferred embodiments will become apparent when the detailed description of the preferred embodiments is read in conjunction with the drawings attached hereto.

DETAILED DESCRIPTION OF PREFERRED EMBODIMENTS

Figure 1:
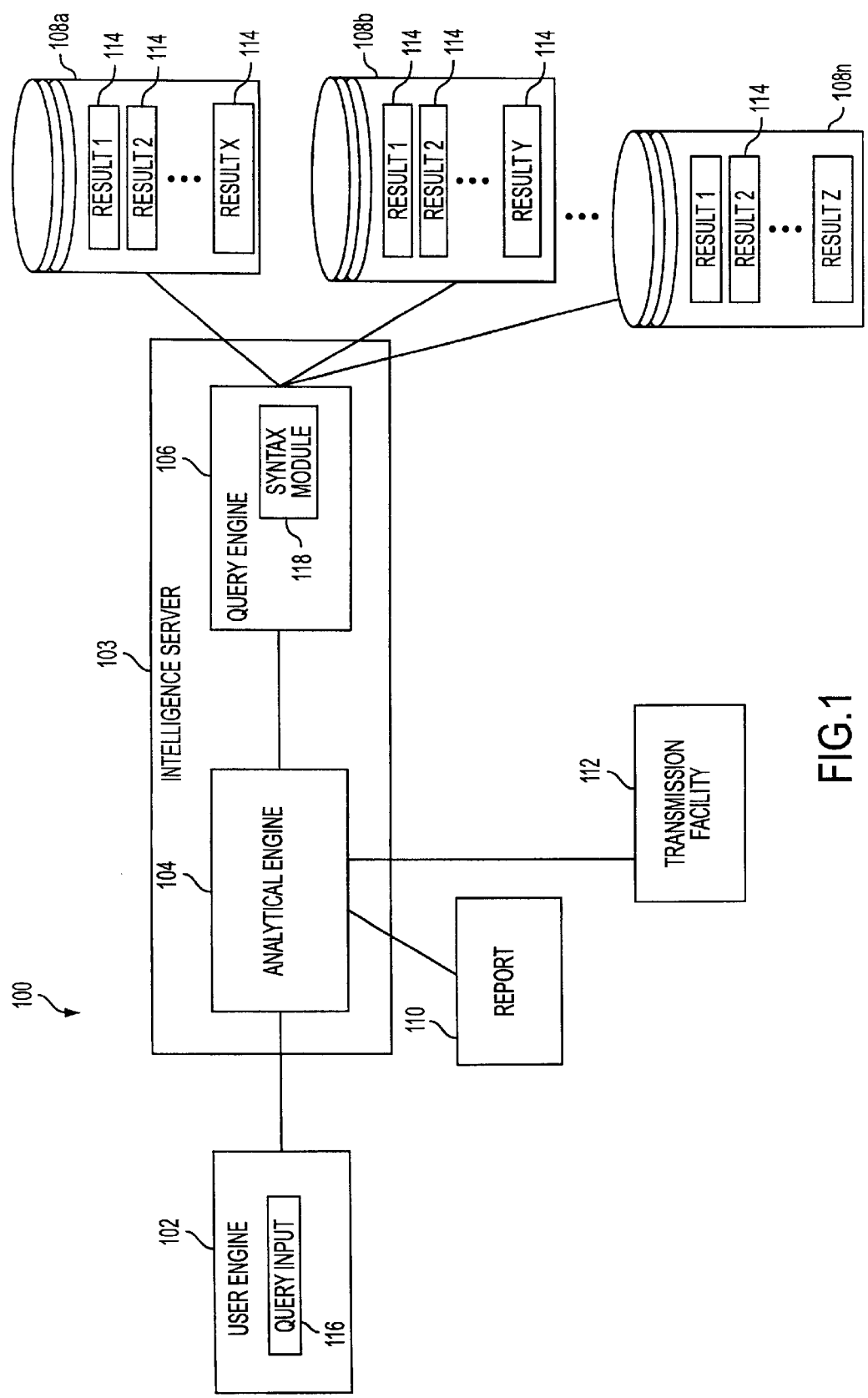
FIG. 1 is a block diagram illustrating an architecture for a system according to an embodiment of the invention.

Reference will now be made in detail to the present preferred embodiments of the invention, examples of which are illustrated in the accompanying drawings in which like reference numerals refer to corresponding elements.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable, without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)—scale data sets, such as warehouses holding terabytes of data or more. The fields and types of data stored within the data storage devices 108a, 108b . . . 108n may also be diverse, and may include, for instance, financial, personal, news, marketing; technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

Figure 2:
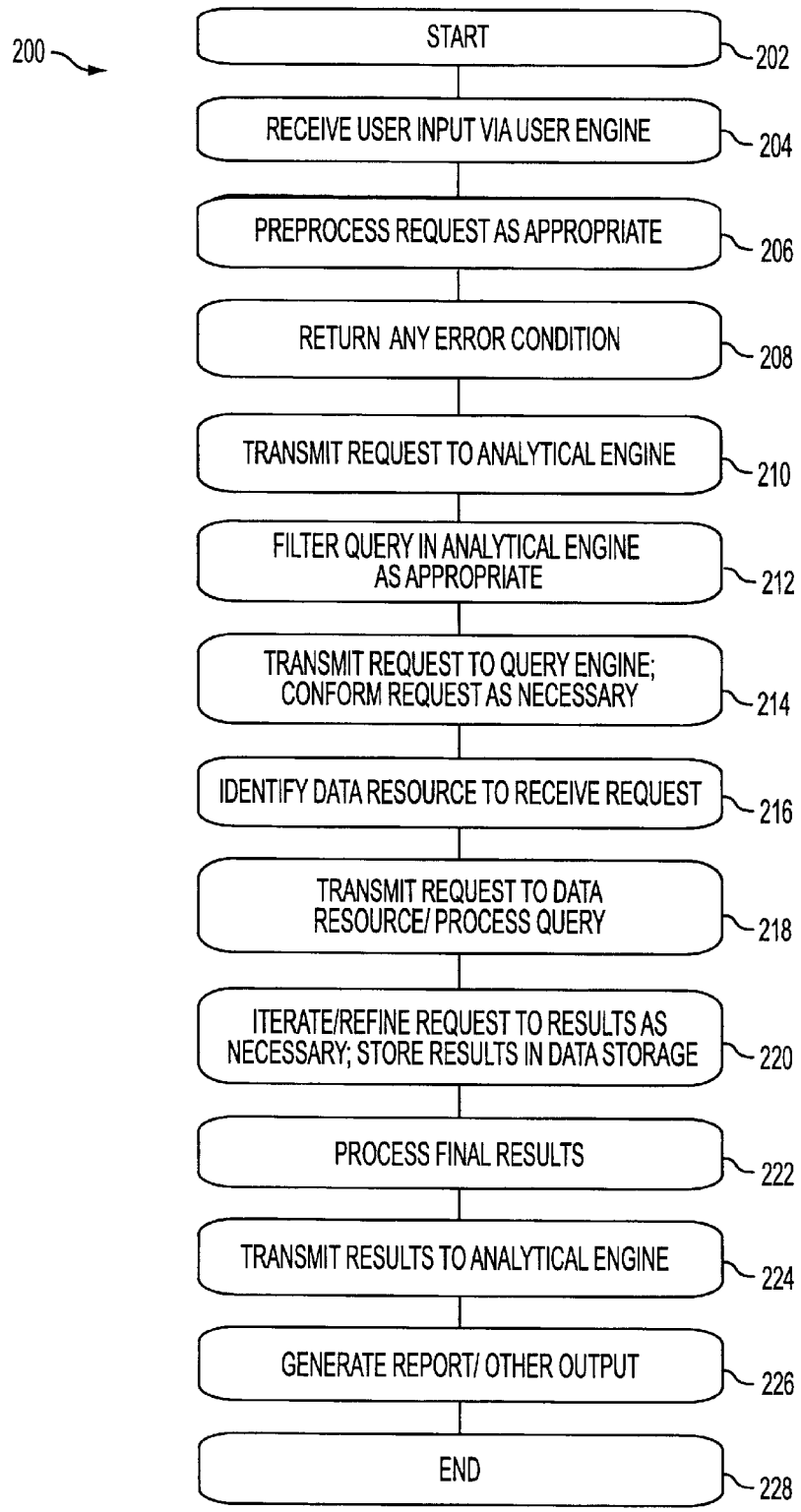
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
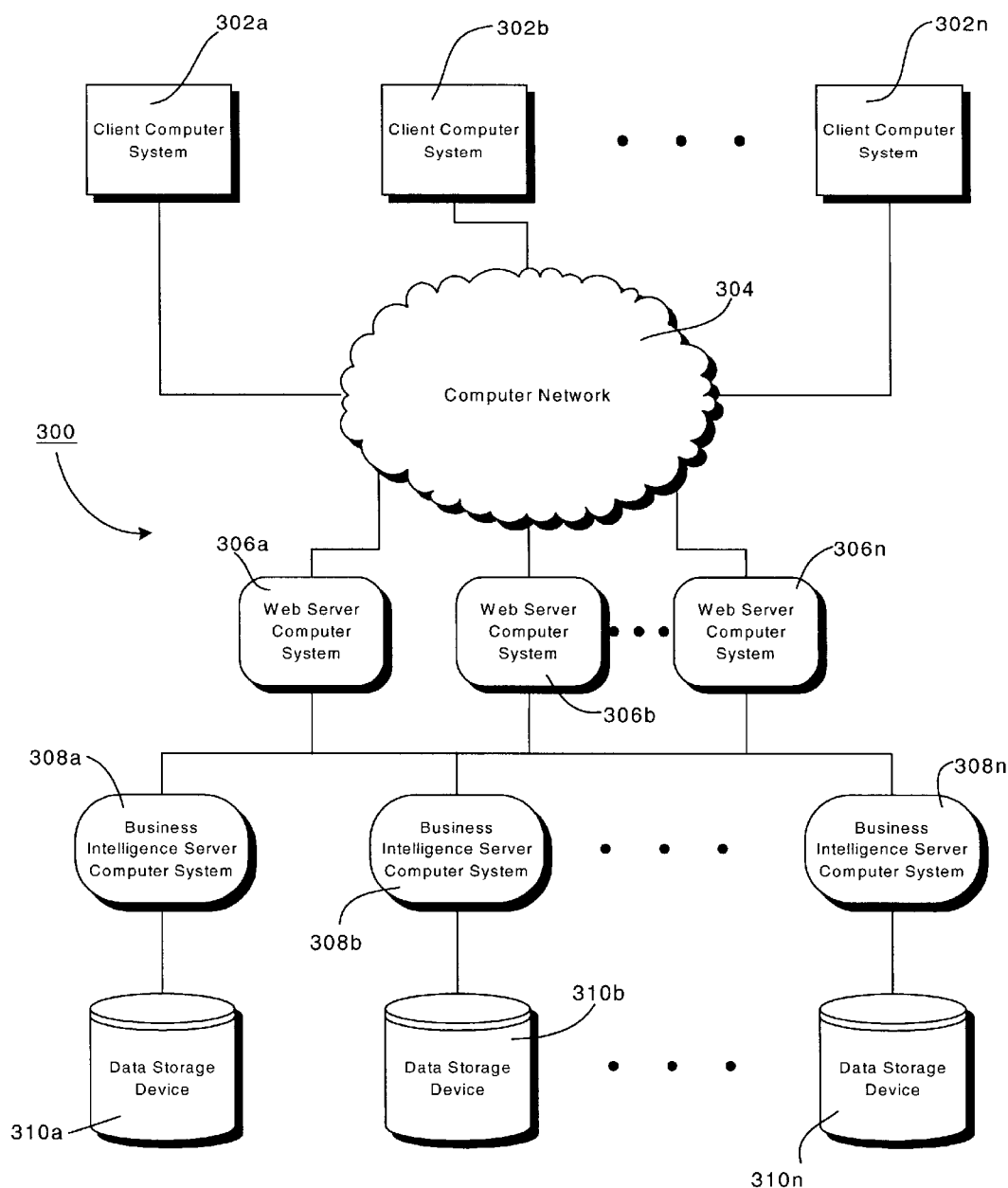
FIG. 3 is a block diagram illustrating an embodiment of a system for providing business information data over a network.

Referring to FIG. 3, there is shown a generalized block diagram illustrating one embodiment of a system 300 for providing business intelligence data over a computer network in accordance with the present invention. In particular, one or more client devices 302a, 302b . . . 302n (where n is an arbitrary number), typically executing a client browser application that supports the HTTP protocol, are connected, typically through an Internet Service Provider (ISP) to a computer network 304, such as the Internet. Further, one or more web server computer systems 306a, 306b . . . 306n (where n is an arbitrary number), executing one or more web server applications are also coupled to the computer network 304 through an ISP. In one embodiment, a plurality of web server computer systems 306a, 306b . . . 306n are operatively joined together to form a server cluster, thereby improving the performance of the web server applications being executed thereon.

In accordance with one embodiment of the present invention, one or more business intelligence server computer systems 308a, 308b . . . 308n are operatively connected to the one or more web servers computer systems 306a, 306b . . . 306n for providing the analytical and querying functions described above in relation to the system of FIG. 1. As will be described in additional detail below, the one or more web server computer systems and the one or more business intelligence computer systems are configured to format, send and receive information utilizing a specialized transmission protocol implementing extensible markup language (XML).

In an embodiment of the invention, upon receiving an HTML query request, the web server application transmits the request to at least one of the business intelligence server applications residing on the business intelligence server computer systems 308. Upon receipt of the request, the business intelligence server computer system 308 may then communicate with one or more data storage devices such as cache files 320, object data 322, and data warehouse 324.

In the above-described embodiment, once the requested information has been retrieved, the entire process is reversed. In particular, the retrieved information is transmitted to the web server computer system 306 and returned to the client device 302 via the computer network 304.

Figure 4:
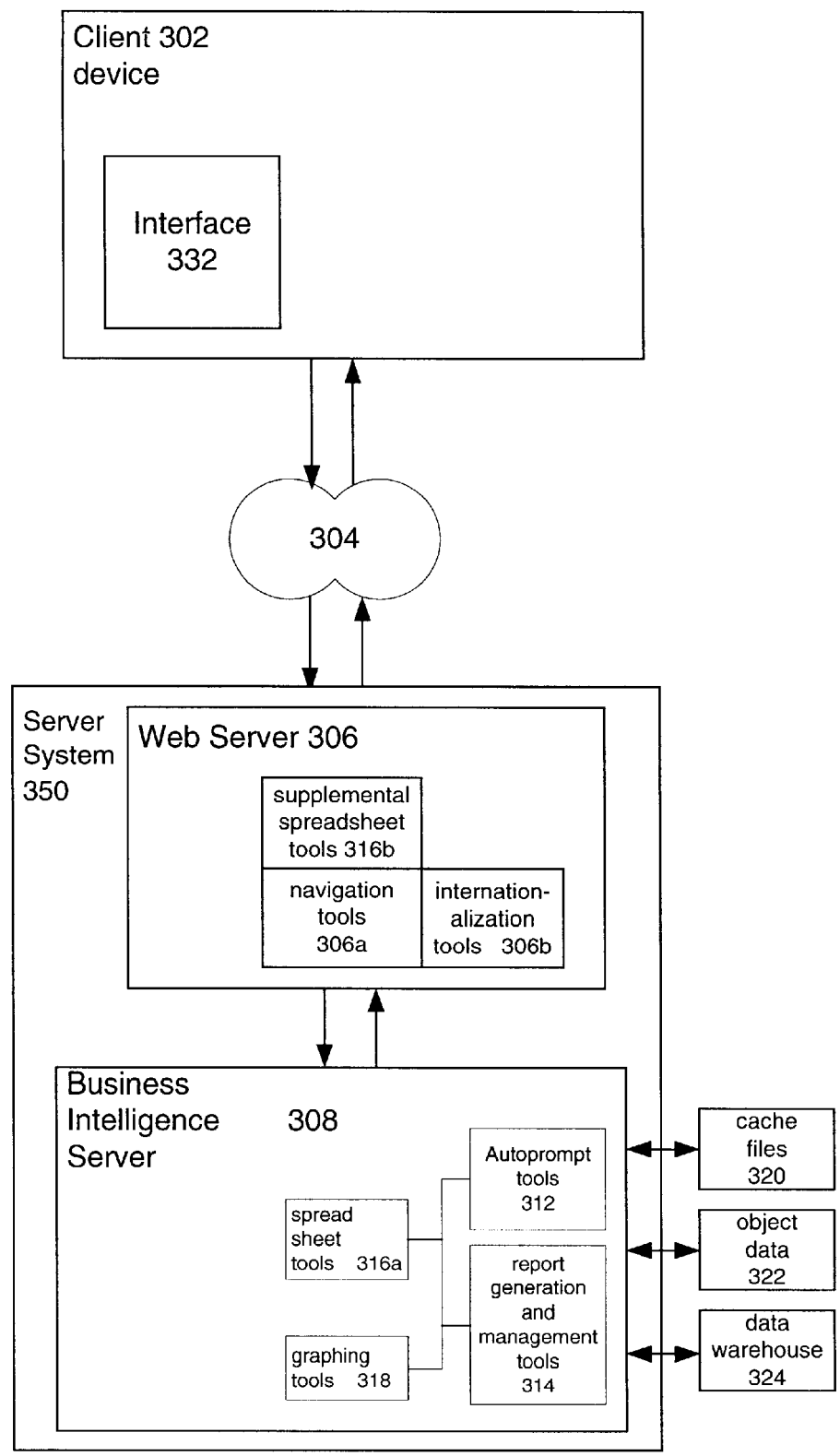
FIG. 4 is a block diagram illustrating a system for providing an HTML/DHTML web interface.

Turning now to FIG. 4, there is shown a block diagram of one embodiment an interface system including a server system 350 comprising a web server 306 and a business intelligence server 308. The server system 350 may comprise one computer system housing both web server 306 and the business intelligence server 308. Alternatively, the server system 350 may include a first computer system on which the web server 306 operates and a second computer system on which the business intelligence server 308 operates. The interface system additionally includes a client device 302, and a plurality of data storage devices 320, 322, and 324 configured in the manner described above.

In this embodiment, the web server computer system 306 receives HTML/DHTML-formatted data 402 from a client device over the computer network 304. Relating specifically to business intelligence data acquisition, one exemplary request may be a search for all consumer sales by an organization's Chicago office during calendar year 1997.

In accordance with an embodiment of the present invention, the client device 302 includes a web interface 332 for accepting a user request. The web interface 332 transmits the requests input by a user from the client device 302 to the business intelligence server 308 in a manner that maximizes the functionality of the entire system such that the various programs are able to efficiently interface with each other.

Upon receiving a request from the user through the client device 302, the web server 306 operates to convey the request to the business intelligence server 308. As will be discussed in additional detail below, processing operations resulting from the receipt of the request at the web server 306 include navigation and internationalization processing. These processing operations are performed by navigation tools 306a and internationalization tools 306b. Processing operations resulting from receipt of the request at the business intelligence server 308 include auto-prompting, graphing functions, spreadsheet functions, and report management. These processing functions are performed by auto-prompting tools 312, report generation and management tools 314, spreadsheet tools 316 and graphing tools 318. Upon completion of the processing operations on the web server 306 and the business intelligence server 308, a processing result is forwarded to the client device 302.

As set forth above, the business intelligence server 308 includes a plurality of HTML tools for providing the user with desired functionality. The auto-prompting tools 312 enable users to specify filtering criteria using a step-by-step process that includes hierarchical tree navigation. For example, a user will be able to specify a store and a month for viewing the store's sales via the interface 332 by navigating from country to state to city to store in one step and from year to month in the next step. Preferably, auto-prompting functionality is achieved using HTML only or by using a combination of HTML and DHTML. A prompt state, which includes the user's current selections, is maintained on the business intelligence server 308. The user is able to accomplish tree-based navigation through the use of pull-down menus on the web interface 332.

The report generation and management tools 314 enable users to specify the full report to be viewed. The user is able to specify what should be in the rows and columns and select a filter. For example, the user could select a report showing sales by store for calendar year 2000. In response, the report generation and management tools 314 would put both sales and store on the report, and choose the year 2000 filter, or choose an auto-prompt on the year. HTML prompting drives the report generation and management tools 314 as outlined above. The report generation and management tools 314 can include not only filtering criteria, but also everything else that can be part of a report, including attributes and metrics. The report generation and management tools accomplish tree control through pull down menus in HTML. Furthermore, instead of dragging and dropping, the report generation and management tools 314 enable the user to very quickly move attributes around the report once it is executed. This movement is accomplished through a pivoting feature that can link to part of a report rather than having to send the whole report. The HTML based report generation and management tools 314 have proven to be more stable and scalable than previously used JAVA systems. The pivoting feature may also be accomplished through DHTML.

Spreadsheet tools 316 give the user an excel-like interface for interacting with the result sets without data entry. In one embodiment, right-click popup menus control drilling, outline mode, sorting, and formatting options and the left mouse button could be used to easily select many rows. These features are particularly useful for drilling. The entire dataset of the report, regardless of the report size, may be downloaded to the user at once so it can all be manipulated and viewed together. The spreadsheet tools 316a require only HTML and are capable of loading only one page of data at a time. However, the entire dataset is held in memory on the business intelligence server 308 so that the rest of the pages can be downloaded very quickly. Spreadsheet options other than those mentioned above are provided through supplemental spreadsheet tools 316b which are accessed through regular HTML clicks on the web server 306. Since the web server 306 doesn't do any data processing other than generating HTML, these operations still occur at a high rate.

Graphing tools 318 enable the user to manipulate the graph appearance without going back to the web server 306. In an embodiment of the invention, manipulation of graph appearances includes changing graph types, adding headers, legends, colors, data formats, etc. via the right-click pop-up menu. The graphing tools 318 also enable a user to drill on graphs, preferably by double-clicking or right-clicking. The graphing tools 318 also may provide for rotation of three-dimensional graphs in real time. The graphing tools 318 can be constructed using only HTML. The graph is actually generated inside of the business intelligence server 308, and the business intelligence server 308 sends a .gif or .jpg file to the web server 306. The web server 306 inserts the received file into the HTML. Only graph types and a few of the properties can be modified over the web. Each change requires the business intelligence server 308 to make the modifications to the graph. However, since the graph is kept in memory on the business intelligence server 308, the process occurs at a rapid rate.

As described above, additional functionality is provided on the web server 306. Internationalization tools 306b have the ability to cause the interface 332 to appear in one or more of many supported languages, which may include European languages, Korean, Japanese, and any other additional languages. The internationalization tools 306b are constructed on the web server 306 so that only the requested language is sent to the client. Sending only one selected language makes the coding easier as well as the HTML less extensive.

Also located on the web server 306 are navigation tools 306a. Navigation tools 306a provide additional functionality by enabling the ability to keep the toolbar/menus, the grid, and the navigation through the reports visible to the user simultaneously. The web server 306 handles the navigation and appearance of all pages quickly and efficiently, eliminating the need for having the navigation tools on the client device 302 within the client browser.

In an embodiment of the invention, a method for providing a web interface for a client device through the use of a web server and a business intelligence server is provided. The method comprises a plurality of steps including a first step of loading a first set of HTML interface tools on the business intelligence server, the first set of HTML interface tools including at least one of spreadsheet tools, graphing tools, auto-prompt tools, and report generation and management tools. A second step includes loading a second set of HTML interface tools located on the web server, the second set of HTML interface tools including at least one of navigation tools and internationalization tools. An additional step includes providing communication between the business intelligence server, the web server, and the user, such that the user is able to utilize the first set of HTML interface tools and the second set of HTML interface tools. The above-described steps can be performed in any order despite the references to "first" and "second" steps. Furthermore, the sub-steps involved in the method include the procedures for loading each of the tools described above for providing the web interface.

In summary, the use of HTML and DHTML processing tools residing on the web server 306 and the business intelligence server 308 eliminates many of the difficulties of java script and ActiveX tools that have been located on the client device. The functionality of HTML tools is improved through the incorporation of the HTML tools on the web server 306 and the business intelligence server 308. DHTML adds greater interactivity and functionality.

It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A web interface system for use with a business information system, the web interface system providing an interface to a user and comprising:
    a first set of HTML interface tools located on a business intelligence server, the first set of HTML interface tools including at least one of spreadsheet tools, graphing tools, auto-prompt tools, and report generation and management tools, wherein the first set of HTML interface tools located on the business intelligence server obtains results through communication with a plurality of storage devices, wherein the plurality of storage devices includes cache files, object data, and data warehouse, wherein the auto-prompting tools additionally comprise DHTML tools;
    a second set of HTML interface tools located on a web server, the second set of HTML interface tools including at least one of navigation tools and internationalization tools; and
    means for providing communication between the business intelligence server, the web server, and the user, such that the user is able to utilize the first set of HTML interface tools and the second set of HTML interface tools.

2. The web interface system of claim 1, wherein the auto-prompting tools comprise means for enabling a client to specify filtering criteria.

3. The web interface system of claim 1, wherein the report generation and management tools comprise means for enabling the user to specify the full report to be viewed.

4. The web interface system of claim 1, wherein the report generation and management tools additionally comprise pull-down menus in HTML.

5. A web interface system for use with a business information system, the web interface system providing an interface to a user and comprising:
    a first set of HTML interface tools located on a business intelligence server, the first set of HTML interface tools including at least one of spreadsheet tools graphing tools, auto-prompt tools, and report generation and management tools, wherein the first set of HTML interface tools located on the business intelligence server obtains results through communication with a plurality of storage devices, wherein the plurality of storage devices includes cache files, object data, and a data warehouse; wherein the report generation and management tools comprise DHTML or HTML pivoting tools for enabling movement of attributes within an executed report;
    a second set of HTML interface tools located on a web sever, the second set of HTML interface tools including at least one of navigation tools and internationalization tools; and
    means for providing communication between the business intelligence server, the web server, and the user, such that the user is able to utilize the first set of HTML interface tools and the second set of HTML interface tool.

6. The web interface system of claim 1, wherein the spreadsheet tools comprise means for providing features to the user including at least one of pop-up menus for controlling drilling, outlining, sorting, and formatting options.

7. The web interface system of claim 1, further comprising additional HTML spreadsheet functions provided on the web server.

8. The web interface system of claim 1, wherein the graphing tools comprise means for generating a graph inside of the business intelligence server and creating a file for transmitting to the web server computer for insertion of the graph into HTML.

9. The web interface system of claim 1, wherein the internationalization tools comprise means for communicating in one of a plurality of languages.

10. The web interface system of claim 1, wherein the navigation tools comprise means for simultaneous display of toolbars, menus, and a grid to the user.

11. A method for providing a web interface for a user through the use of a web server and a business intelligence server, the method comprising the steps of:
    loading a first set of HTML interface tools on the business intelligence server, the first set of HTML interface tools including at least one of spreadsheet tools, graphing tools, auto-prompt tools, and report generation and management tools;
    loading DHTML auto-prompting tools having means for enabling the user to specify filtering criteria;
    providing a plurality of storage devices for communication with the first set of HTML interface tools on the business intelligence server, wherein the plurality of storage devices includes cache file, object data, and a data warehouse;
    loading a second set of HTML interface tools located on the web server, the second set of HTML interface tools including at least one of navigation tools and internationalization tools; and
    providing communication means between the business intelligence server, The web server, and the user, such that the user is able to utilize the first set of HTML interface tools and the second set of HTML interface tools.

12. The method of claim 11, wherein the step of loading the first set of HTML interface tools comprises loading means for enabling the user to specify the full report to be viewed and means for providing pull-down menus in HTML.

13. A method for providing a web interface for a user through the use of a web server and a business intelligence server, the method comprising the steps of:

loading a first set of HTML interface tools on the business intelligence server, the first set of HTML interface tools including at least one of spreadsheet tools, graphing tools, auto-prompt tools, and report generation and management tools;

loading DHTML or HTML pivoting tools for enabling movement of attributes within an executed report;

providing a plurality of storage devices for communication with the first set of HTML interface tools on the business intelligence server, wherein the plurality of storage devices includes cache files, object data, and a data warehouse;

loading a second set of HTML interface tools located on the web server, the second set of HTML interface tools including at least one of navigation tools and internationalization tools; and providing communication means between the business intelligence server, the web server, and the user, such that the user is able to utilize the first set of HTML interface tools and the second set of HTML interface tools.

14. The method of claim 11, wherein the step of loading the first set of HTML interface tools comprises loading means for displaying features to the user, the features including pop-up menus for controlling drilling, outlining, sorting, and formatting options.

15. The method of claim 11, further comprising loading additional HTML spreadsheet functions provided on the web server.

16. The web interface system of claim 5, wherein the auto-prompting tools comprise means for enabling a client to specify filtering criteria.

17. The web interface system of claim 5, wherein the report generation and management tools comprise means for enabling the user to specify the full report to be viewed.

18. The web interface system of claim 5, wherein the report generation and management tools additionally comprise pull-down menus in HTML.

19. The web interface system of claim 5, wherein the spreadsheet tools comprise means for providing features to the user including at least one of pop-up menus for controlling drilling, outlining, sorting, and formatting options.

20. The web interface system of claim 5, further comprising additional HTML spreadsheet functions provided on the web server.

21. The web interface system of claim 5, wherein the graphing tools comprise means for generating a graph inside of the business intelligence server and creating a file for transmitting to the web server computer for insertion of the graph into HTML.

22. The web interface system of claim 5, wherein the internationalization tools comprise means for communicating in one of a plurality of languages.

23. The web interface system of claim 5, wherein the navigation tools comprise means for simultaneous display of toolbars, menus, and a grid to the user.

24. The method of claim 13, wherein the step of loading the first set of HTML interface tools comprises loading means for enabling the user to specify the full report to be viewed and means for providing pull-down menus in HTML.

25. The method of claim 13, wherein the step of loading the first set of HTML interface tools comprises loading means for displaying features to the user, the features including pop-up menus for controlling drilling, outlining, sorting, and formatting options.

26. The method of claim 13, further comprising loading additional HTML spreadsheet functions provided on the web server.

* * * * *